US012583215B2

(12) United States Patent
Zheng et al.

(10) Patent No.: US 12,583,215 B2
(45) Date of Patent: Mar. 24, 2026

(54) METHOD FOR BONDING FILM TO LENS

(71) Applicant: Huawei Technologies Co., Ltd., Shenzhen (CN)

(72) Inventors: Xiaowen Zheng, Dongguan (CN); Chao Zhang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 365 days.

(21) Appl. No.: 18/254,022

(22) PCT Filed: Nov. 22, 2021

(86) PCT No.: PCT/CN2021/132043
§ 371 (c)(1),
(2) Date: May 23, 2023

(87) PCT Pub. No.: WO2022/105909
PCT Pub. Date: May 27, 2022

(65) Prior Publication Data
US 2023/0415471 A1      Dec. 28, 2023

(30) Foreign Application Priority Data

Nov. 23, 2020      (CN) .......................... 202011327158.1

(51) Int. Cl.
| | |
|---|---|
| B32B 41/00 | (2006.01) |
| B32B 37/00 | (2006.01) |
| B32B 37/06 | (2006.01) |

(52) U.S. Cl.
CPC .......... B32B 41/00 (2013.01); B32B 37/0046 (2013.01); B32B 37/06 (2013.01); *B32B 2250/02* (2013.01); *B32B 2551/00* (2013.01)

(58) Field of Classification Search
CPC ..... B32B 41/00; B32B 37/0046; B32B 37/06; B32B 2250/02; B32B 2551/00; B29D 11/0073; B29D 11/00009; B29L 2011/00; B29C 63/0047; B29C 63/02
USPC ................... 156/60, 64, 350, 351, 378, 379
See application file for complete search history.

(56) References Cited

U.S. PATENT DOCUMENTS

2008/0314499 A1* 12/2008 Begon ................. B29C 63/0073
156/367

FOREIGN PATENT DOCUMENTS

| CN | 110126249 A | 8/2019 |
|---|---|---|
| CN | 209851584 U | 12/2019 |
| CN | 111098487 A | 5/2020 |
| CN | 111516254 A | 8/2020 |
| CN | 111862799 A | 10/2020 |
| TW | 201544402 A | 12/2015 |

* cited by examiner

*Primary Examiner* — Michael N Orlando
*Assistant Examiner* — Joshel Rivera
(74) *Attorney, Agent, or Firm* — Conley Rose, P.C.

(57) ABSTRACT

A method for bonding a film to a lens and a device for bonding a film to a lens includes a first jig and a second jig that are controlled to move relative to each other, to gradually bond a middle position to an edge position on the lens to the film, so that bubbles between the film and the lens can be reduced, and a good film bonding effect can be achieved. In addition, the method can be performed without processing the film in advance, and obtaining the lens through injection molding after the film is formed, so that optical performance or mechanical performance of the bonded film can be ensured.

20 Claims, 6 Drawing Sheets

100

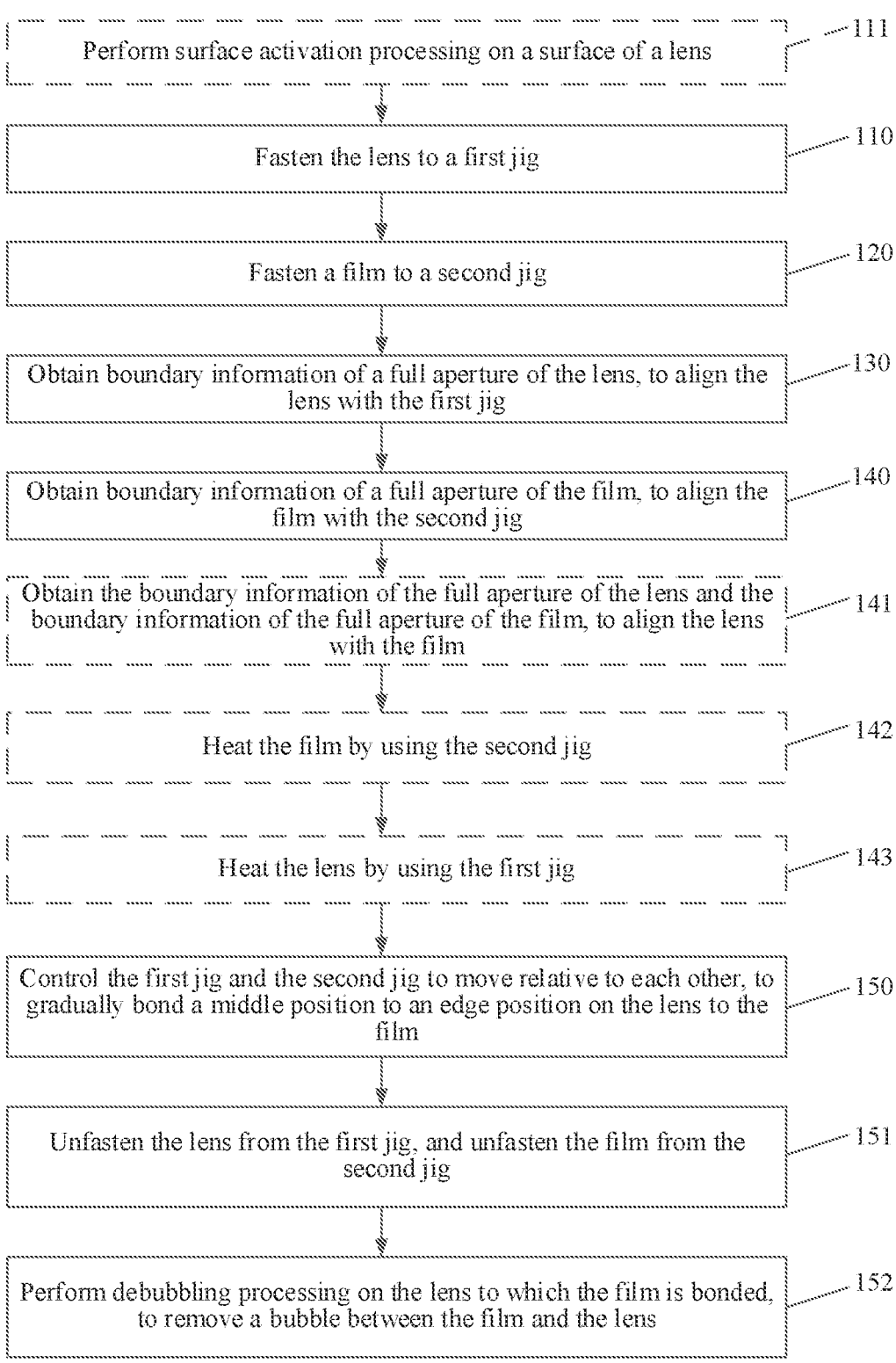

Perform surface activation processing on a surface of a lens — 111

Fasten the lens to a first jig — 110

Fasten a film to a second jig — 120

Obtain boundary information of a full aperture of the lens, to align the lens with the first jig — 130

Obtain boundary information of a full aperture of the film, to align the film with the second jig — 140

Obtain the boundary information of the full aperture of the lens and the boundary information of the full aperture of the film, to align the lens with the film — 141

Heat the film by using the second jig — 142

Heat the lens by using the first jig — 143

Control the first jig and the second jig to move relative to each other, to gradually bond a middle position to an edge position on the lens to the film — 150

Unfasten the lens from the first jig, and unfasten the film from the second jig — 151

Perform debubbling processing on the lens to which the film is bonded, to remove a bubble between the film and the lens — 152

FIG. 7

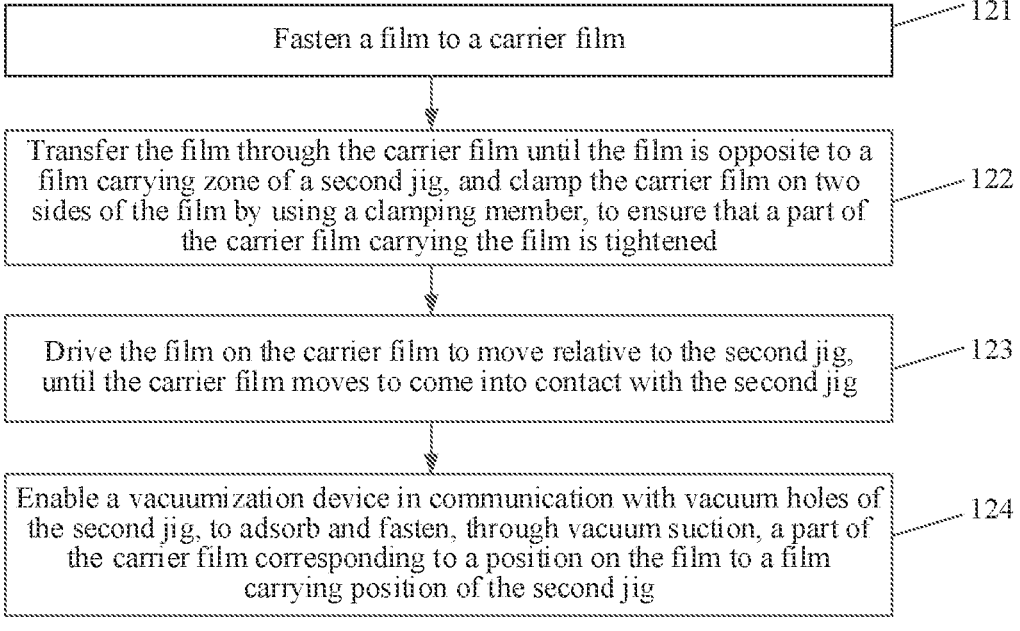

Fasten a film to a carrier film — 121

Transfer the film through the carrier film until the film is opposite to a film carrying zone of a second jig, and clamp the carrier film on two sides of the film by using a clamping member, to ensure that a part of the carrier film carrying the film is tightened — 122

Drive the film on the carrier film to move relative to the second jig, until the carrier film moves to come into contact with the second jig — 123

Enable a vacuumization device in communication with vacuum holes of the second jig, to adsorb and fasten, through vacuum suction, a part of the carrier film corresponding to a position on the film to a film carrying position of the second jig — 124

FIG. 8

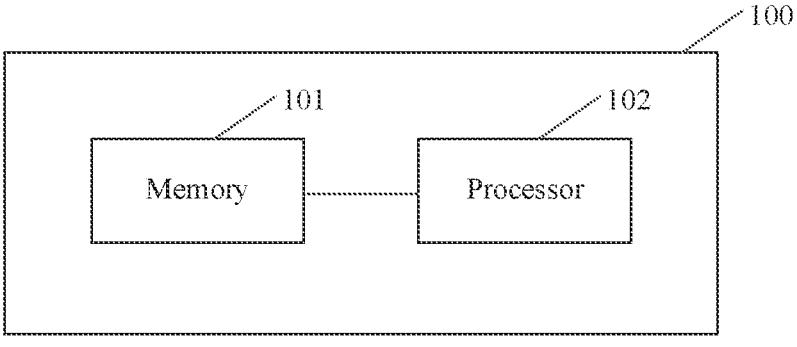

100

Memory — 101     Processor — 102

FIG. 9

METHOD FOR BONDING FILM TO LENS

CROSS-REFERENCE TO RELATED APPLICATIONS

This is a National Stage of International Patent Application No. PCT/CN2021/132043 filed on Nov. 22, 2021, which claims priority to Chinese Patent Application No. 202011327158.1 filed on Nov. 23, 2020. Both of the aforementioned applications are hereby incorporated by reference in their entireties.

TECHNICAL FIELD

This application relates to the field of film material bonding technologies, and in particular, to a method for bonding a film to a lens.

BACKGROUND

In the field of optical imaging, a film often needs to be bonded to an optical lens, to improve an imaging effect of the optical lens. To achieve a flat film bonding effect, currently, a main manner of bonding a film to a lens is: bonding a planar film to a surface of a thin-sheet substrate, hot-bending an entirety formed by the film and the substrate, and placing a hot-bent thin sheet in an injection molding jig. After an optical material is injection-molded, an optical element having an optical characteristic consistent with that of the film may be obtained. However, after the film is hot-bent, due to a characteristic of the film, the film is very likely to extend and cannot maintain an initial pre-bending shape. As a result, surface precision of the finally obtained optical element is affected. In addition, because a temperature of the injection-molded optical material is generally high, optical performance or mechanical performance of the film is likely affected.

SUMMARY

This application provides a method for bonding a film to a lens, to obtain an optical element with high surface shape precision, ensure optical performance and mechanical performance of the film, and ensure that the optical element finally obtained through bonding can have good quality.

According to a first aspect, this application provides a method for bonding a film to a lens. The method for bonding a film includes:

fastening the lens to a first jig;

fastening the film to a second jig, where the second jig is a deformable flexible jig;

obtaining boundary information of a full aperture of the lens, to align the lens with the first jig;

obtaining boundary information of a full aperture of the film, to align the film with the second jig; and controlling the first jig and the second jig to move relative to each other, to gradually bond a middle position to an edge position on the lens to the film.

In this application, by using the method for bonding a film, the planar film can gradually come into contact with and be bonded to the lens from the middle position to the edge position, so that the planar film from the middle position to the edge position can be evenly deformed, thereby avoiding a case that after the planar film is bonded to the lens, optical performance, mechanical performance, and the like of the film are changed, and consequently, optical performance and mechanical performance of an optical element finally obtained through bonding are affected. In addition, the method for bonding a film in this application is easy to operate, and does not need to first heat the planar film into a curved film with an ideal shape through processes such as heating, pressure preservation, stretching, and softening, and then bond the curved film to the lens, thereby avoiding a case that optical performance or mechanical performance of the bonded film is affected due to the processes such as heating, pressure preservation, stretching, and softening while simplifying the bonding method.

In addition, the middle position to the edge position on the lens are gradually bonded to the film, so that a bubble between the film and the lens can be easily discharged, thereby ensuring quality of bonding between the film and the lens.

In addition, in this application, the boundary information of the full aperture of the lens is obtained, to align the lens with the first jig; and the boundary information of the full aperture of the film is obtained, to align the film with the second jig. Compared with a manner in which only some positions on the film and the lens are identified and aligned, in this implementation of this application, the boundary information of the full aperture of the film and the boundary information of the full aperture of the lens are obtained, to ensure accuracy of alignment between the film and the second jig and accuracy of alignment between the lens and the first jig.

In some implementations of this application, before the gradually bonding a middle position to an edge position on the lens to the film, the method further includes the following step:

heating the film by using the second jig.

In this implementation of this application, the film can be softened by heating the film, so that the film can be better bonded to a film carrying zone. In addition, in a process of bonding the film to the lens, because the film can be more easily deformed after being heated, the film can be bonded to a surface of the lens flatly, thereby avoiding a problem such as a wrinkle that occurs when the film is bonded to the film bonding surface of the lens. In addition, in this implementation of this application, all positions on the film can be evenly heated by using the second jig, to ensure that the positions on the film can have a same deformation capability, and avoid a wrinkle or a change in an optical axis direction caused by uneven stretching of the positions on the film, thereby ensuring quality of an optical element finally obtained by bonding the film. In addition, the film is heated by using the second jig. Because the second jig has a specific heat preservation function, the film can be heated in an entire bonding process, to ensure that the film can always be in a heated state in the process of bonding the film to the lens, thereby achieving a better bonding effect. In addition, because the second jig has a specific heat preservation effect, after a film heater is stalled out, the second jig can still continuously heat the film, thereby reducing energy consumption.

In some implementations, before the gradually bonding a middle position to an edge position on the lens to the film, the method further includes the following step:

heating the lens by using the first jig, to enable a temperature difference between the lens and the film to be less than 30° before the lens and the film are bonded.

In this implementation of this application, the lens is heated, so that a temperature difference between the film and the lens can be reduced in the process of bonding the film to the lens, to ensure that a stress between the film and the lens can be small after the film and the lens are bonded and cooled, thereby ensuring stability of the bonding between the film and the lens. In some implementations, a temperature difference between the lens and the film is less than 30°, so that stability of the bonding between the film and the lens can be effectively ensured. In this implementation of this application, all positions on the lens are evenly heated by using the first jig, to ensure a temperature balance between the positions on the lens in the process of bonding the film to the lens.

In some implementations, the boundary information of the full aperture of the lens is obtained by using a first alignment camera, where a photographing range of the first alignment camera covers the full aperture of the lens; and the boundary information of the full aperture of the lens is obtained by using a second alignment camera, where a photographing range of the second alignment camera covers the full aperture of the film.

Because the photographing range of the first alignment camera can cover the full aperture of the lens, the boundary information of the full aperture of the lens can be obtained by using the first alignment camera, and a central position on the lens can be obtained more accurately, to ensure accuracy of alignment between the lens and the first jig. Because the photographing range of the second alignment camera can cover the full aperture of the film, the boundary information of the full aperture of the film can be obtained by using the second alignment camera, and a central position on the film can be obtained more accurately, to ensure accuracy of alignment between the film and the second jig.

In some implementations, the method for bonding a film to a lens further includes:

unfastening the lens from the first jig, and unfastening the film from the second jig; and performing debubbling processing on the lens to which the film is bonded, to remove a bubble between the film and the lens.

In this implementation, by performing debubbling processing on the lens to which the film is bonded, the bubble between the film and the lens can be further removed, thereby further improving an effect of bonding the film to the lens.

In some implementations, the debubbling processing includes;

placing the lens to which the film is bonded in a debubbling jig, and performing pressure preservation and heat preservation processing on the lens to which the film is bonded, where during the pressure preservation and heat preservation processing, a pressure is 0.1 MPa to 1 MPa, a temperature is 40° C. to 80° C., and a heat preservation and pressure preservation time is 5 min to 1 h. In this implementation, the bubble between the lens and the film can be fully removed through adequate pressure preservation and heat preservation processing, to ensure an effect of bonding between the lens and the film.

In some implementations, a size of the film is the same as an effective aperture of the lens, or a size of the film is less than an effective aperture of the lens, to avoid a case that a surplus of the film needs to be cut off through another process (for example, laser cutting) after the film is bonded, thereby reducing manufacturing processes. In addition, it can be further ensured that a wrinkle does not easily occur when the film is bonded to the lens.

In some implementations, the second jig includes a film carrying zone, the film is fastened to the film carrying zone, and a surface that is of the lens and to which the film is bonded is a film bonding surface; and when the film bonding surface of the lens is a concave surface, the film carrying zone of the second jig is a convex surface, and a curvature radius of the film carrying zone is less than a curvature radius of the film bonding surface; or when the film bonding surface of the lens is a convex surface, the film carrying zone of the second jig is a plane or a concave surface, and a curvature radius of the film carrying zone is greater than a curvature radius of the film bonding surface.

In this implementation, for a shape of a different film bonding surface of the lens, correspondingly, the second jig has a film carrying zone in a corresponding shape, to ensure that regardless of whether the film bonding surface of the lens is a concave surface or a convex surface, the film can be gradually to the lens from the middle position to the edge position, thereby ensuring film bonding quality of the lens.

In some implementations, the film carrying zone is provided with vacuum holes in an array, and the film is fastened to the film carrying zone by using vacuum adsorption force of the vacuum holes.

In some implementations, an effective aperture of the lens ranges from 1 mm to 60 mm, to ensure that the film can be flatly bonded to a bonding surface of the lens without generating a wrinkle, to ensure a good effect of bonding the film.

In some implementations, when a film bonding surface of the lens is a convex surface, a ratio of a curvature radius of the film bonding surface to a bonding aperture of the film bonding surface is greater than 1.2; or when a film bonding surface of the lens is a concave surface, a ratio of a curvature radius of the film bonding surface to a bonding aperture of the film bonding surface is greater than 1.5, to ensure that no wrinkle is generated when the film is bonded to the lens.

In some implementations, a surface that is of the lens and to which the film is bonded is a film bonding surface, and a surface shape of the film bonding surface is a spherical surface, an aspheric surface, or a free recurved surface.

In some implementations, the fastening the film to a second jig includes:

fastening the film to a carrier film;

clamping the carrier film on two sides of the film by using a clamping member, and making the film opposite to the second jig, where an orthographic projection of the second jig on a plane on which the film is located covers the film; and controlling the carrier film and the second jig to move relative to each other until the film on the carrier film is bonded to the second jig.

In this implementation, by carrying the film through the carrier film, the film can be protected from being easily damaged in a subsequent process of being transferred to the film carrying zone of the second jig, and the film can be more easily transferred.

In some implementations, before the controlling the first jig and the second jig to move relative to each other, the method further includes:

obtaining the boundary information of the full aperture of the lens and the boundary information of the full aperture of the film, to align the lens with the film, to further improve precision of bonding the film to the lens.

In some implementations, before the controlling the first jig and the second jig to move relative to each other, the method further includes:

performing surface activation processing on a surface of the lens.

In this implementation of this application, the surface activation processing is performed on the lens, so that the film can be more firmly attached to a surface of the lens, and the surface of the lens can be cleaned, to ensure that no impurity exists between the lens and the film after the film is bonded, and ensure film bonding quality.

According to a second aspect, this application further provides a device for bonding a film to a lens. The device for bonding a film to a lens includes: a memory, a processor, and a program for bonding a film to a lens, where the program for bonding a film to a lens is stored in the memory and is runnable on the processor, and the program for bonding a film to a lens is executed by the processor to implement the foregoing method for bonding a film to a lens.

The device for bonding a film to a lens provided in this application can perform the foregoing method for bonding a film to a lens. Therefore, through the device for bonding a film to a lens in this application, the planar film can gradually come into contact with and be bonded to the lens from the middle position to the edge position, so that the planar film from the middle position to the edge position can be evenly deformed, thereby avoiding a case that after the planar film is bonded to the lens, optical performance, mechanical performance, and the like of the film are changed, and consequently, optical performance and mechanical performance of an optical element finally obtained through bonding are affected. The method for bonding a film performed through the device for bonding a film to a lens in this application is easy to operate, and does not need to first heat the planar film into a curved film with an ideal shape through processes such as heating, pressure preservation, stretching, and softening, and then bond the curved film to the lens, thereby avoiding a case that optical performance or mechanical performance of the bonded film is affected due to the processes such as heating, pressure preservation, stretching, and softening while simplifying the bonding method.

In addition, through the device for bonding a film to a lens in this application, a bubble between the film and the lens can be easily discharged, thereby ensuring quality of bonding between the film and the lens. In a process of bonding the lens to the film, the boundary information of the full aperture of the lens and the boundary information of the full aperture of the film can be obtained, to ensure accuracy of alignment between the film and the second jig and accuracy of alignment between the lens and the first jig.

BRIEF DESCRIPTION OF DRAWINGS

To describe the structural attitudes and functions of this application more clearly, the following describes this application in detail with reference to the accompanying drawings and specific embodiments.

FIG. 7 is a schematic flowchart of a method for bonding a film to a lens according to some implementations of this application:

FIG. 8 is a flowchart of specific operations of fastening a film to a second jig when the film is bonded to a lens through the device for bonding a film in FIG. 2; and FIG. 9 is a schematic diagram of working modules of a device for bonding a film to a lens according to an implementation of this application.

DESCRIPTION OF EMBODIMENTS

The following describes the technical solutions in embodiments of this application with reference to the accompanying drawings in embodiments of this application.

This application provides a method for bonding a film to a lens, to bond a film to a lens. According to the method for bonding a film to a lens in this application, a disadvantage such as a bubble or a wrinkle between the film and a curved cover plate can be avoided, and surface shape precision, optical performance, and mechanical performance of an optical element obtained by bonding the film to the lens can be ensured.

In this application, the optical element obtained by bonding the film to the lens may be applied to various types of terminals. For example, in some implementations of this application, the terminal may be augmented reality (Augmented Reality, AR) glasses, virtual reality (Virtual Reality, VR) glasses, a mobile phone, a tablet, a camera, or the like.

In this application, the film may also be any type of film. For example, the film may be an optical film having an optical axis, such as a reflective polarization film, a quarter-wave plate, or a half-wave plate, or may be various types of optical films, such as an anti-reflective film, an anti-scratch film, a light scattering film, and an anti-fog film. In this application, by bonding different types of films to the lens, optical performance or mechanical performance of an optical element obtained by bonding the film to the lens can be correspondingly improved. In some implementations of this application, a thickness of the film is 0.02 mm to 0.5 mm, so that optical performance or mechanical performance of an optical element obtained by bonding the film to the lens can be improved, and a case that a thickness and optical performance of the optical element such as a transmittance of light are affected by an excessively large thickness of the film can be avoided.

Figure 1:
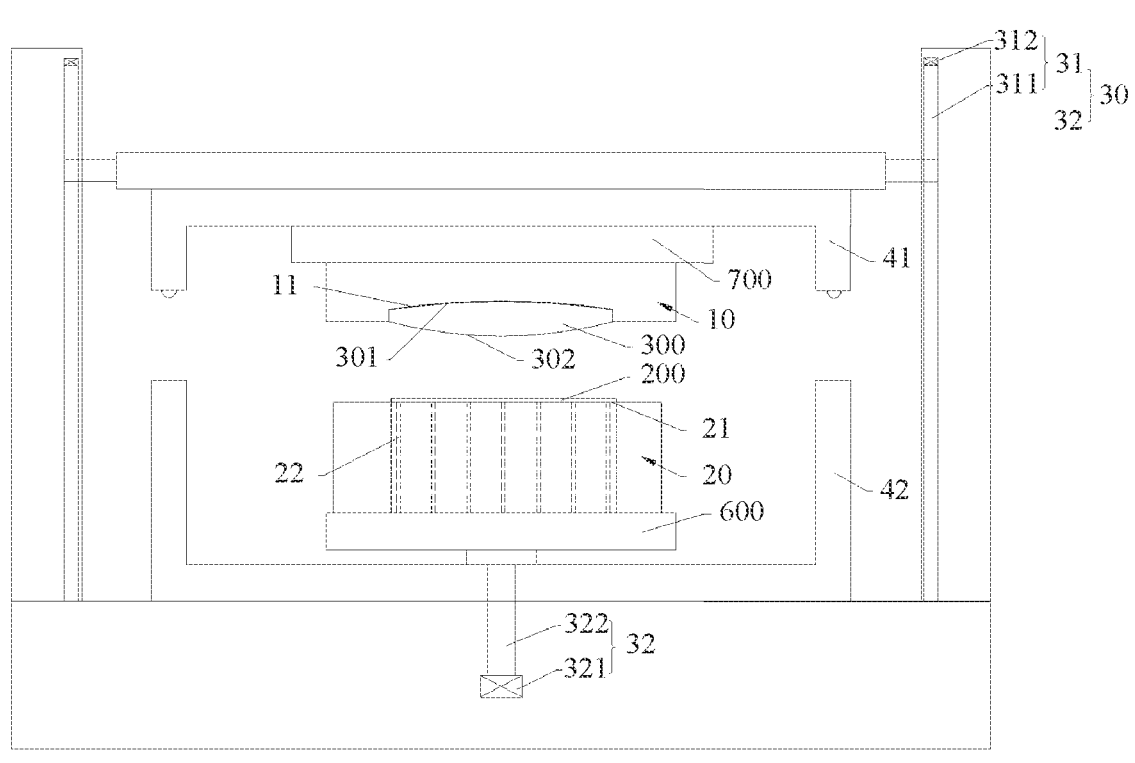
FIG. 1 is a schematic diagram of a structure of a device for bonding a film to a lens according to an implementation of this application.

In this application, the film is bonded to the lens through a device for bonding a film to a lens. Referring to FIG. 1, FIG. 1 is a schematic diagram of a structure of a device 100 for bonding a film to a lens according to an implementation of this application. In this implementation, a film 200 is bonded to a lens 300 through the device 100 for bonding a film to a lens. Specifically, in this implementation, the device 100 for bonding a film to a lens includes a first jig 10, a second jig 20, and a driving mechanism 30. The first jig 10 can be configured to fasten the lens 300, the second jig 20 can be configured to fasten the film 200, and the driving mechanism 30 can be configured to drive the first jig 10 and the second jig 20 to move relative to each other, to cause the lens 300 fastened to the first jig 10 and the film 200 fastened to the second jig 20 to move relative to each other, to bond the film 200 to the lens 300.

Specifically, in this implementation of this application, the first jig 10 is a rigid jig, and can stably fasten the lens 300. Specifically, in some implementations of this application, the first jig 10 may be made of a material such as plastic (such as heat-resistant nylon plastic), metal (such as aluminum or iron), an alloy (such as an aluminum alloy), or ceramic that has specific strength and is not easy to deform.

In some implementations, the first jig 10 is a rigid jig, and the lens 300 is clamped and fastened to the first jig 10. It may be understood that, in another implementation of this application, the first jig 10 may alternatively be another fastening structure. For example, in some implementations, a vacuum adsorption zone may be disposed in a lens mounting zone 11 of the first jig 10, and the lens 300 can be fastened to the first jig 10 through vacuum adsorption. Alternatively, in some implementations, the first jig 10 includes a snap-fit portion, and the lens 300 is in tight snap-fit with and fastened to the first jig 10 by using the snap-fit portion.

The second jig 20 is a deformable flexible jig, to make it convenient to subsequently bond the film 200 to the lens 300. Specifically, in this implementation, a manufacturing material of the second jig 20 may be a flexible material such as rubber or silicone.

In this implementation of this application, the first jig 10 has the lens mounting zone 11, and the lens 300 is mounted in the lens mounting zone 11. The second jig 20 includes a film carrying zone 21, and the film 200 is fastened in the film carrying zone 21. In this implementation, the film carrying zone 21 and the lens mounting zone 11 are disposed opposite to each other, so that the film 200 fastened in the film carrying zone 21 can be accurately bonded to the lens 300.

In some implementations, a size of the lens mounting zone 11 may be correspondingly adjusted according to a size of a lens 300 to be mounted, to fasten lenses 300 of different sizes.

In some implementations of this application, a surface of the lens mounting zone 11 of the first jig 10 may be further covered with a protective layer such as Teflon. When fastened to the first jig 10, the lens 300 comes into contact with the protective layer, to avoid causing damage to the lens 300 when the first jig 10 fastens the lens 300. In addition, in some implementations of this application, a shape of a surface that is of the protective layer and that is away from the first jig 10 is substantially the same as a shape of a surface that is of the lens 300 and that faces the first jig 10. To be specific, when the lens 300 is fastened to the first jig 10, the surface of the lens 300 can be substantially bonded to the protective layer, to ensure that the first jig 10 can properly support and limit the lens 300, and further ensure that the lens 300 can be stably fastened to the first jig 10.

Figure 2:
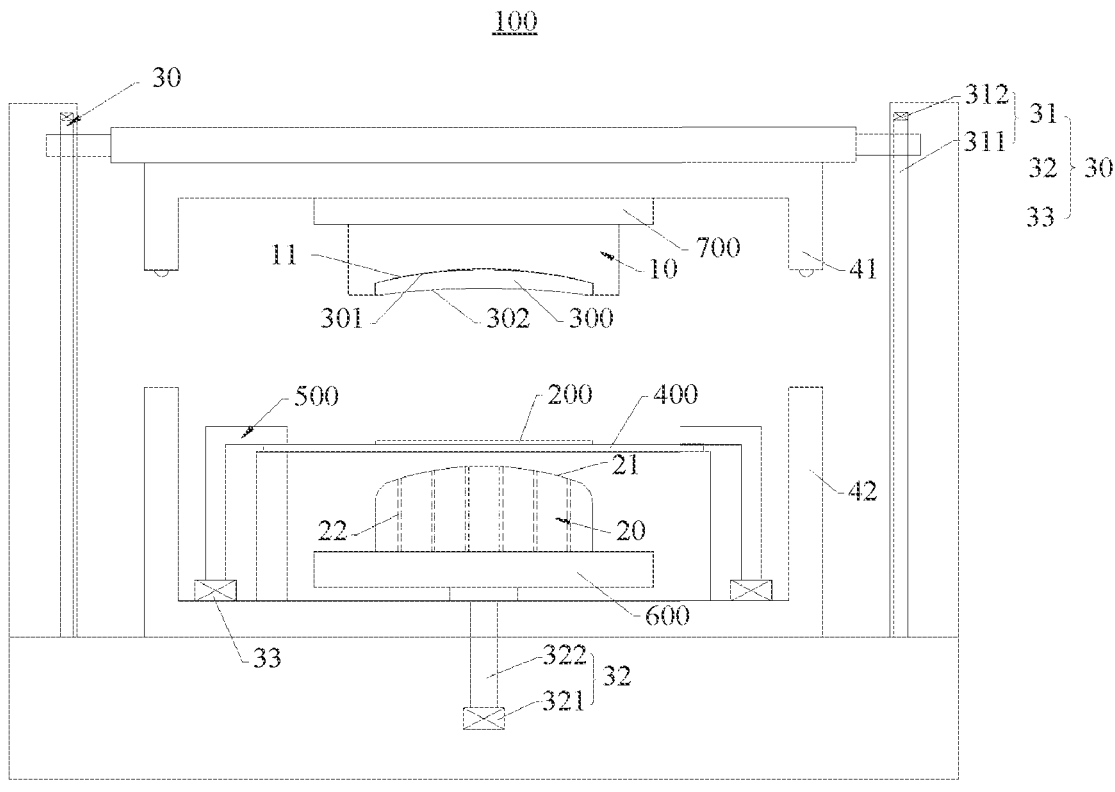
FIG. 2 is a schematic diagram of a structure of a device for bonding a film to a lens according to another implementation of this application.

In some implementations of this application, vacuum holes 22 disposed in an array are disposed in the film carrying zone 21. The vacuum holes 22 can be connected to a vacuumization device, to generate vacuum adsorption force, to adsorb and fasten the film 200 to the film carrying zone 21. It may be understood that, in some other implementations of this application, the film 200 may alternatively be fastened to the film carrying zone 21 in some other manners. For example, referring to FIG. 2, FIG. 2 is a schematic diagram of a structure of a device 100 for bonding a film to a lens according to another implementation of this application. In the implementation shown in FIG. 2, a film 200 is fastened to a carrier film 400, and the device 100 for bonding a film to a lens further includes a clamping member 500. The clamping member 500 clamps the carrier film 400 on two sides of the film 200, to tighten the carrier film 400 carrying the film 200. The clamping member 500 can move relative to a second jig 20 until the carrier film 400 comes into contact with a film carrying zone 21 of the second jig 20, and a part of the carrier film 400 carrying the film 200 is tightened and bonded to the film carrying zone 21, to fasten the film 20 to the film carrying zone 21. In some implementations, a film carrying zone 21 is provided with vacuum holes 22 in an array, the device 100 for bonding a film to a lens also includes a clamping member 500, and a film 200 is fastened to a carrier film 400. A position on the carrier film 400 corresponding to the film carrying zone 21 is fastened to the film carrying zone 21 through joint action of adsorption force of the vacuum holes 22 and tightening force of the carrier film 400 driven by the clamping member 500, so that the film 200 carried on the carrier film 400 is fastened to the film carrying zone 21. In this implementation, due to joint action of the adsorption force of the vacuum holes 22 and a clamping function of the clamping member 500, the position on the carrier film 400 corresponding to the film carrying zone 21 can be more firmly and stably bonded to the film carrying zone 21, so that the film 200 can be more firmly and stably bonded to the film carrying zone 21.

It should be noted that, in some implementations of this application, the film 200 is fastened to the carrier film 400. After the film 200 is bonded to a lens 300, the carrier film 400 can be easily peeled from the film 200. For example, in some implementations, the film 200 is fastened to the carrier film 400 through a photosensitive adhesive. After the film 200 is bonded to the lens 300, the film 200 can be easily peeled from the carrier film 400 through ultraviolet exposure, to obtain a required photonic component.

In this implementation of this application, the first jig 10 and the second jig 20 are disposed opposite to each other, so that the lens 300 fastened to the first jig 10 is opposite to the film 200 fastened to the second jig 20. The film 200 can be bonded to the lens 300 by moving the first jig 10 and the second jig 20 relative to each other. In this implementation, the first jig 10 is located above the second jig 20, and the first jig 10 can move toward the second jig 20. It may be understood that, in another implementation of this application, the second jig 20 may alternatively be located above the first jig 10, and the second jig 20 may alternatively move toward the first jig 10.

It may be understood that, in some other implementations of this application, the first jig 10 and the second jig 20 may alternatively be disposed in another position relationship. For example, in some implementations, the first jig 10 and the second jig 20 may alternatively be disposed in parallel. In a subsequent process of bonding the film 200 to the lens 300, the second jig 20 may be overturned, so that the second jig 20 is disposed opposite to the first jig 10.

In this implementation of this application, a shape of the film carrying zone 21 of the second jig 20 matches a shape of a film bonding surface of the lens 300, to ensure that a good bonding effect can be achieved when the film 200 carried on the film carrying zone 21 is bonded to the lens 300.

Specifically, the lens 300 includes a light incident surface 301 and a light emergent surface 302 that are disposed opposite to each other. Light is incident into the lens 300 through the light incident surface 301, and is emergent through the light emergent surface 302. In this implementation of this application, the lens 300 includes a film bonding surface, and the film 200 is bonded to the film bonding surface. In some implementations, the film bonding surface of the lens 300 may be the light incident surface 301 or the light emergent surface 302. To be specific, the film 200 is bonded to the light incident surface 301 or the light emergent surface 302. In this case, there is only one film bonding surface of the lens 300. In some other implementations, both the light incident surface 301 and the light emergent surface 302 of the lens 300 may be film bonding surfaces. In other words, a film may be bonded to each of the light incident surface 301 and the light emergent surface 302 of the lens 300. In this case, there are two film bonding surfaces of the lens 30). In this application, when the lens 300 is fastened to the first jig 10, a film bonding surface of the lens 300 on which film bonding needs to be performed is away from the first jig 10, to make it convenient for the film 200 to be bonded to the film bonding surface of the lens 3).

In this application, the film bonding surface of the lens 300 may be a spherical surface, an aspheric surface, or a free recurved surface. The free recurved surface indicates that there is only one vertex on each of two sides of the film bonding surface. For example, the free recurved surface may be a concave surface or a convex surface, or may be a free curved surface whose edge is a plane and whose middle zone is a concave surface or a convex surface.

Figure 3:
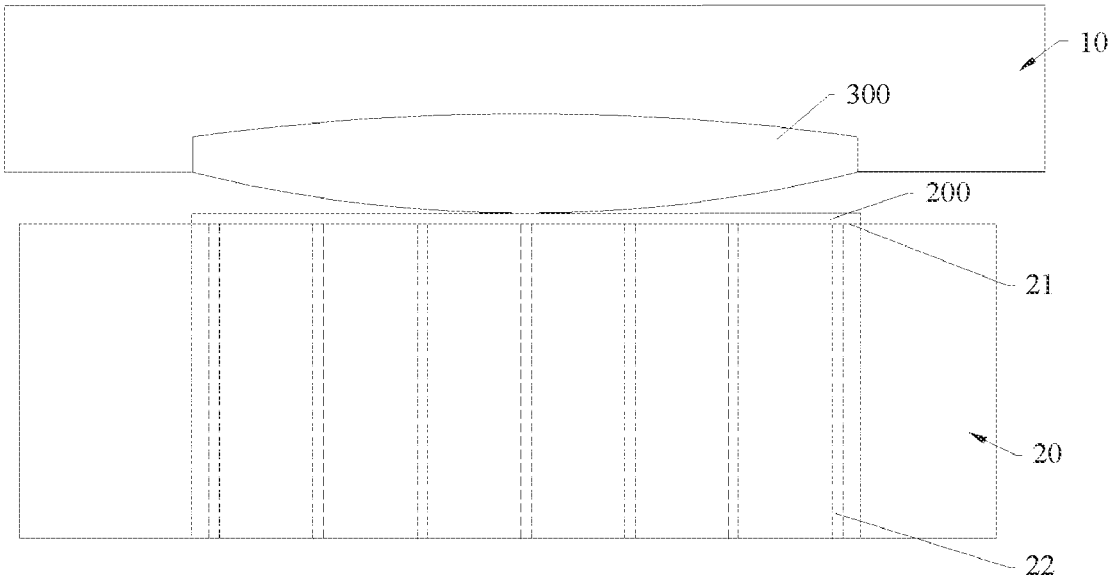
FIG. 3 is a schematic diagram of a state of bonding a lens and a film when a film bonding surface of the lens is a convex surface and a film carrying zone of a second jig is a plane.
Figure 4:
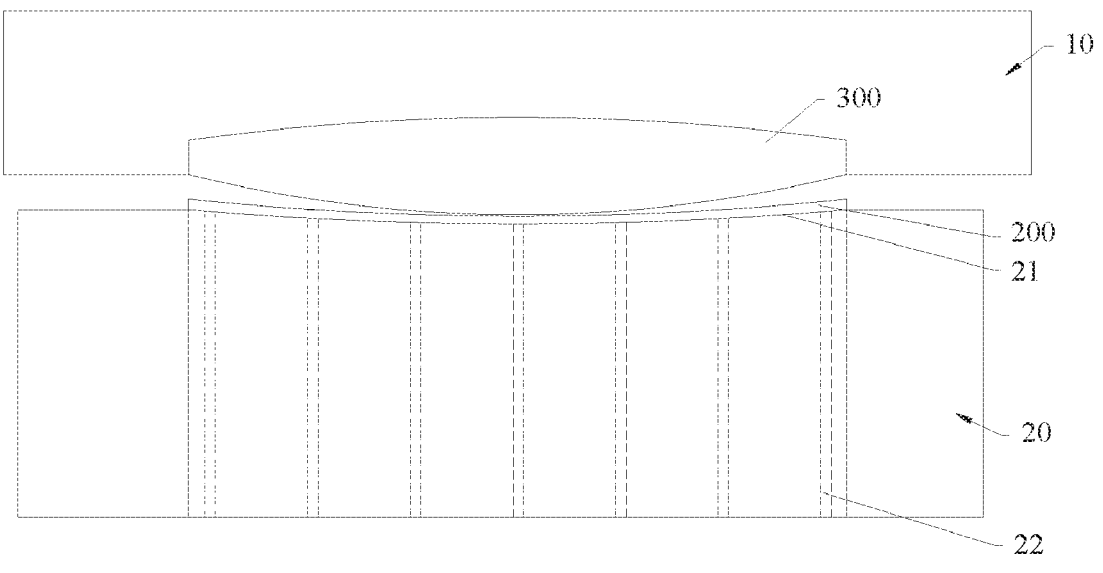
FIG. 4 is a schematic diagram of a state of bonding a lens and a film when a film bonding surface of the lens is a convex surface and a film carrying zone of a second jig is a concave surface.

In some implementations, the film bonding surface of the lens 300 is a convex surface, and the film carrying zone 21 of the second jig 20 may be a plane or a concave surface. When the film carrying zone 21 of the second jig 20 is a concave surface, a curvature radius of the film carrying zone 21 is greater than a curvature radius of the film bonding surface of the lens 300. Referring to FIG. 3 and FIG. 4, FIG. 3 is a schematic diagram of bonding a lens 300 and a film 200 when a film bonding surface of the lens 300 is a convex surface and a film carrying zone 21 of a second jig 20 is a plane; and FIG. 4 is a schematic diagram of bonding a lens 300 and a film 200 when a film bonding surface of the lens 300 is a convex surface and a film carrying zone 21 of a second jig 20 is a concave surface. When the film bonding surface of the lens 300 is a convex surface, the film carrying zone 21 of the second jig 20 is a plane or a concave surface, and a curvature radius of the film carrying zone 21 is greater than a curvature radius of the film bonding surface of the lens 300, it can be ensured that when the first jig 10 and the second jig 20 are close to each other, to bond the lens 300 fastened to the first jig 10 to the film 200 fastened to the second jig 20, a central zone to an edge zone of the film 200 can be gradually bonded to the lens 300, so that air between the film 200 and the lens 300 can be better removed, to avoid generating a bubble in a process of bonding the film 200 to the lens 300.

Figure 5:
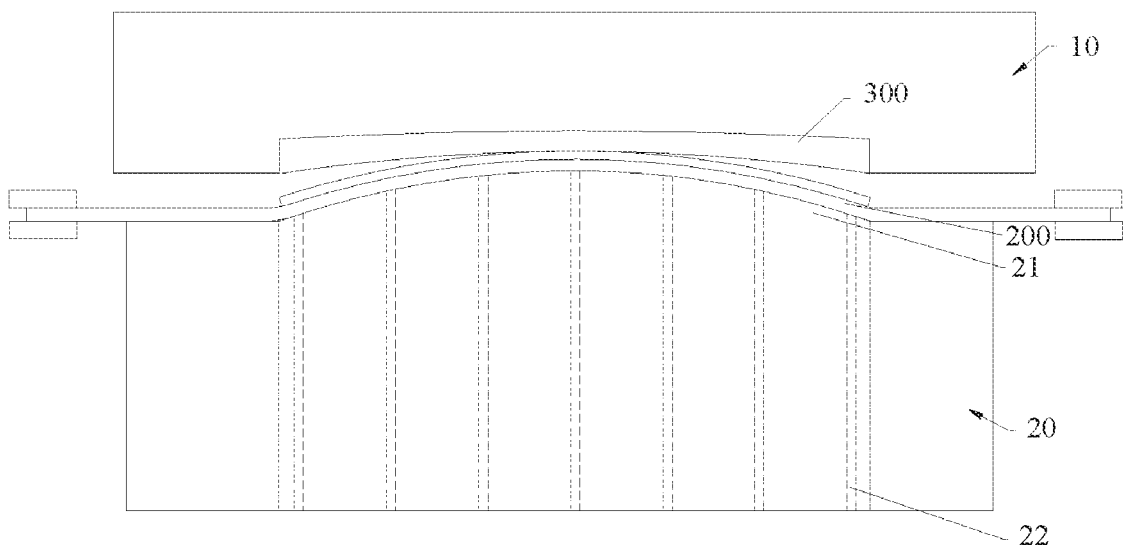
FIG. 5 is a schematic diagram of a state of bonding a lens and a film when a film bonding surface of the lens is a concave surface and a film carrying zone of a second jig is a convex surface.

In some implementations, when the film bonding surface of the lens 300 is a concave surface, the film carrying zone 21 of the second jig 20 is a convex surface, and a curvature radius of the film carrying zone 21 is less than a curvature radius of the film bonding surface of the lens 300. In some implementations, a curvature radius of a central position on the film carrying zone 21 may be less than 1.5 times a curvature radius of the film bonding surface being a concave surface, to reduce a risk of generating a central bubble when the film 200 is bonded to the lens 300. Referring to FIG. 5, FIG. 5 is a schematic diagram of bonding a lens 300 and a film 200 when a film bonding surface of the lens 300 is a concave surface and a film carrying zone 21 of a second jig

20 is a convex surface. When the film bonding surface of the lens 300 is a concave surface, the film carrying zone 21 of the second jig 20 is a convex surface, and a curvature radius of the film carrying zone 21 is less than a curvature radius of the film bonding surface of the lens 300, it can be ensured that when the first jig 10 and the second jig 20 are close to each other, to bond the lens 300 fastened to the first jig 10 to the film 200 fastened to the second jig 20, a central zone to an edge zone of the film 200 are gradually bonded to the lens 300, so that air between the film 200 and the lens 300 can be better removed, to avoid generating a bubble in a process of bonding the film 200 to the lens 300.

Figure 6:
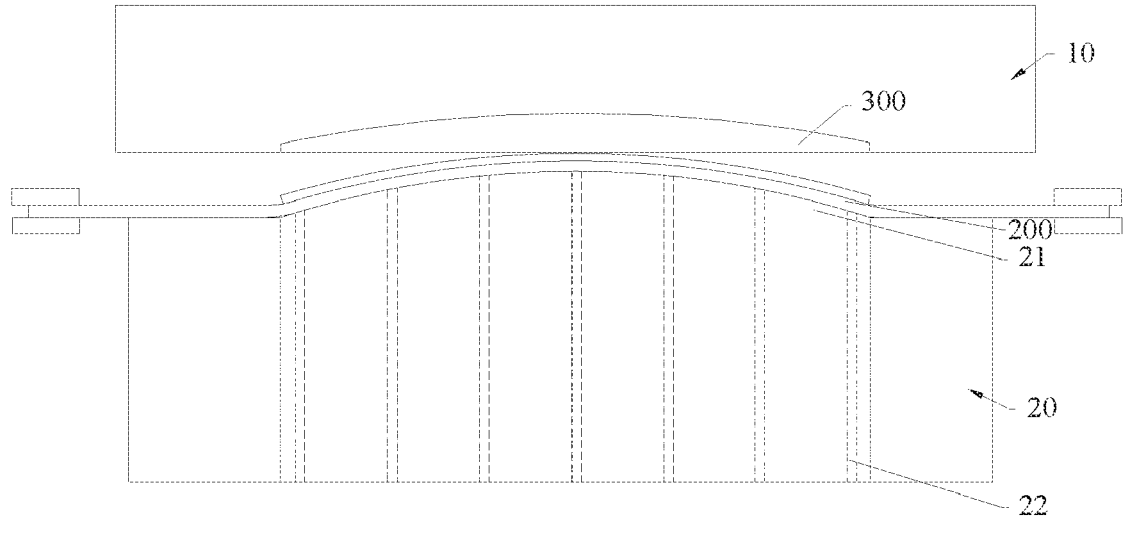
FIG. 6 is a schematic diagram of a state of bonding a lens and a film when a film bonding surface of the lens is a plane and a film carrying zone of a second jig is a convex surface.

It may be understood that, in some implementations of this application, the bonding surface of the lens 300 may alternatively be a plane. In this case, the film carrying zone 21 of the second jig 20 may be a convex surface. Referring to FIG. 6, FIG. 6 is a schematic diagram of bonding a lens 300 and a film 200 when a film bonding surface of the lens 300 is a plane and a film carrying zone 21 of a second jig 20 is a convex surface. When the bonding surface of the lens 300 is a plane, and the film carrying zone 21 of the second jig 20 is a convex surface, the film 200 carried on the film carrying zone 21 can preferentially come into contact with a central zone of the lens 300. In a process in which the first jig 10 and the second jig 20 further approach each other, a central zone to an edge zone of the film 200 are gradually bonded to the lens 300, so that air between the film 200 and the lens 300 can be better removed, to avoid generating a bubble in a process of bonding the film 200 to the lens 300.

In this implementation of this application, the film 200 is a planar film. In some implementations, a size of the film 200 is the same as an effective aperture of the lens 300 or slightly less than an effective aperture of the lens 300, to avoid a case that a surplus of the film 200 needs to be cut off through another process (for example, laser cutting) after the film 200 is bonded, thereby reducing manufacturing processes. In addition, it can be further ensured that a wrinkle does not easily occur when the film 200 is bonded to the lens 300. For example, in some implementations of this application, when the lens 300 is a plane at an edge and is a concave surface or a curved surface at a middle position, and a diameter of the film 200 is less than an effective aperture of the lens 300, the film 200 covers only the middle position on the lens 300, but does not cover the edge of the lens 300, thereby ensuring that a required optical effect can be achieved, and avoiding a problem that a bubble is generated because curvatures from the middle position to the edge position covered by the film 200 change rapidly. It should be noted that in this implementation of this application, the effective aperture of the lens 300 is an aperture of a partial lens, of the lens, that can perform an actual optical function. For example, when the lens 300 is a plane at an edge and is a concave surface or a curved surface at a middle position, an edge plane part of the lens is generally a carrying structure, to facilitate mounting of the lens, and does not actually affect transmission in an optical path, and a middle concave surface or convex surface part of the lens 200 actually affects the optical path. Therefore, an effective aperture of the lens 200 is an aperture of the middle concave surface or convex surface part of the lens 200. In addition, it should be noted that the lens 300 in this application may be a circular lens, or may be a lens in another shape such as a square lens. This is not specifically limited herein. A shape of the film 200 is the same as a shape of the lens 300. In addition, that a size of the film 200 is the same as an effective aperture of the lens 300 or slightly less than an effective aperture of the lens 300 is specifically that a size of the film in each direction is the same as or slightly less than a size of the lens 300 in each corresponding direction. For example, in some implementations of this application, both the lens 300 and the film 200 are circular. That a size of the film 200 is the same as an effective aperture of the lens 300 or slightly less than an effective aperture of the lens 300 is that a diameter of the film 200 is less than or equal to the effective aperture of the lens 300.

In some implementations of this application, an effective aperture of the lens 300 ranges from 1 mm to 60 mm. In this implementation of this application, because the film 200 is a planar film, the planar film is bonded to the bonding surface of the lens 300. When the bonding surface of the lens 300 is a curved surface, the film 200 is deformed to some extent, to ensure that each position on the film 200 can be flatly bonded to the bonding surface, thereby avoiding a wrinkle. In some implementations of this application, an effective aperture of the lens 300 ranges from 1 mm to 60 mm, to ensure that the film 200 can be flatly bonded to a bonding surface of the lens 300 without generating a wrinkle, to ensure a good effect of bonding the film. In some implementations, when a film bonding surface of the lens 300 is a convex surface, a ratio of a curvature radius of the film bonding surface to a bonding aperture of the film bonding surface is greater than 1.2; or when a film bonding surface of the lens 300 is a concave surface, a ratio of a curvature radius of the film bonding surface to a bonding aperture of the film bonding surface is greater than 1.5, to ensure that no wrinkle is generated when the film 200 is bonded to the lens 300. It should be noted that In this implementation of this application, when the film bonding surface is a spherical surface, a curvature radius of the film bonding surface is a curvature radius of the film bonding surface being the spherical surface; or when the film bonding surface is an aspheric surface or a free curved surface, a curvature radius of the film bonding surface is a curvature radius of a spherical surface closest to the surface shape of the film bonding surface obtained by fitting the film bonding surface. The bonding aperture of the film bonding surface is a size of a projection generated through an orthographic projection of the film to a plane perpendicular to an optical axis of the lens when the film 200 is bonded to the lens 300.

Referring to FIG. 1 again, in some implementations of this application, the driving mechanism 30 includes a first driving mechanism 31 and a second driving mechanism 32. The first driving mechanism 31 is connected to the first jig 10, and the second driving mechanism 32 is connected to the second jig 20. The first driving structure 31 is configured to drive the first jig 10 to move toward the second jig 20, and the second driving mechanism 32 is configured to drive the second jig 20 to move toward the first jig 10, so that the film 200 fastened to the second jig 20 is bonded to the lens 300 fastened to the first jig 10.

In this implementation of this application, each of the first driving mechanism 31 and the second driving mechanism 32 may be a driving mechanism such as a screw rod driving mechanism, a guide rail driving mechanism, or a cylinder driving mechanism. Specifically, in the implementation shown in FIG. 1, the first driving structure 31 is a guide rail driving mechanism, and the guide rail driving mechanism includes a guide rail 311 and a guide rail motor 312 connected to one end of the guide rail 311. The first jig 10 is connected to the guide rail 311, and can move along the guide rail 311 under driving of the guide rail motor 312. The second driving mechanism 32 is a cylinder driving mechanism. The cylinder driving mechanism includes a cylinder 321 and a connecting rod 322 connected to the cylinder 321.

The second jig 20 is connected to an end of the connecting rod 322 away from the cylinder 321. Under driving of the cylinder 321, the second jig 20 can move in an extending direction of the connecting rod 322. In this implementation, the extending direction of the connecting rod 322 is a direction in which the second jig 20 faces the first jig 10.

It may be understood that, in another implementation of this application, each of the first driving mechanism 31 and the second driving mechanism 32 may alternatively be another type of driving mechanism, to generate relative movement under driving of the driving mechanisms.

Referring to FIG. 2, in some other implementations of this application, the driving mechanism 30 further includes a third driving structure 33. The third driving mechanism 33 is connected to the clamping member 500, to drive the clamping member 500 to clamp or release the carrier film 400. It may be understood that, in this implementation, the clamping member 500 may also be various types of driving mechanisms such as a screw rod driving mechanism, a guide rail driving mechanism, and a cylinder driving mechanism.

Referring to FIG. 1 and FIG. 2 again, in some other implementations of this application, the device 100 for bonding a film to a lens may further include a first cavity 41 and a second cavity 42 that is used in collaboration with the first cavity 41. In some implementations of this application, the first jig 10 is located in the first cavity 41, and the second jig 20 is located in the second cavity 42. The first cavity 41 and the second cavity 42 are disposed opposite to each other, and the first cavity 41 and the second cavity 42 can move relative to each other until the first cavity 41 and the second cavity 42 are jointed together in a covering manner to form a confined space, so that the first jig 10 and the second jig 20 are located in the confined space, and a process of bonding the film 200 to the lens 300 is performed in the confined space, thereby preventing external impurities from entering between the film 200 and the lens 300, and improving bonding quality. In addition, in some implementations, the confined space can be connected to the vacuumization device, and the vacuumization device vacuumizes the confined space to form a vacuum environment, thereby further avoiding generating a bubble between the film and the lens when the film 200 is bonded to the lens 300, and further improving quality of bonding between the film 200 and the lens 300.

In this implementation, the first jig 10 is located in the first cavity 41, and the first driving mechanism 31 is connected to the first cavity 41 to drive the first cavity 41 to move relative to the second cavity 42. In this implementation, the first jig 10 can move through the connection between the first cavity 41 and the first driving mechanism 31.

This application further provides a method for bonding a film to a lens, to bond a film 200 to a lens 300. In this implementation of this application, through the device 100 for bonding a film to a lens, the film 200 can be to film bonding surfaces in different shapes of different lenses 300. Specifically, in this application, using an example in which the film 200 is bonded to the lens 300 whose film bonding surface is a convex surface through the device 100 for bonding a film to a lens shown in FIG. 1, and using an example in which the film 200 is bonded to the lens 300 whose film bonding surface is a concave surface through the device 100 for bonding a film to a lens shown in FIG. 2, a method for bonding the film 200 of the lens 300 in this application is described. Referring to FIG. 7, FIG. 7 is a schematic flowchart of a method for bonding a film 200 of a lens 300 according to some implementations of this application. In this implementation of this application, the bonding method for bonding the film 200 to the lens 300 specifically includes:

Step 110: Fasten the lens 300 to a first jig 10.

In this implementation of this application, the lens 300 is mounted in the first jig 10, to fasten the lens 300. In addition, when the lens 300 is mounted in the first jig 10, a film bonding surface of the lens 300 to which the film 200 needs to be bonded is away from the first jig 10, to facilitate subsequent bonding of the film.

In this implementation of this application, the film bonding surface of the lens 300 may be a convex surface, a concave surface, or a plane. For example, in the implementation shown in FIG. 1, the film bonding surface of the lens 300 fastened to the first jig 10 is a convex surface. In the implementation shown in FIG. 2, the film bonding surface of the lens 300 fastened to the first jig 10 is a concave surface.

Step 120: Fasten the film 200 to a second jig 20.

In this implementation of this application, the film 200 is fastened to a film carrying zone 21 of the second jig 20, to fasten the film 200. In some implementations, when the film 200 is fastened to the second jig 20 of the device 100 for bonding a film in the implementation shown in FIG. 1, the fastening the film 200 to the second jig 20 specifically includes:

transferring the film 200 to the film carrying zone 21 of the second jig 20, and enabling the vacuumization device, so that the film 200 is fastened to the film carrying zone 21 of the second jig 20 under vacuum adsorption force of the vacuum holes 22.

In the implementation shown in FIG. 1, the film carrying zone 21 of the second jig 20 is a plane, and the film 200 of the plane is tiled in the film carrying zone 21 under vacuum adsorption force of the vacuum holes 22. It may be understood that, in some other implementations of this application, the film carrying zone 21 may alternatively be a concave surface, and a curvature radius of the concave surface is greater than a curvature radius of the film bonding surface of the lens 300.

Referring to FIG. 8, FIG. 8 is a flowchart of specific operations of fastening a film to a second jig 20 when the film 200 is bonded to a lens 300 through the device 100 for bonding a film shown in FIG. 2. In some other implementations of this application, when the film 200 is fastened to the second jig 20 of the device 100 for bonding a film in the implementation shown in FIG. 2, the fastening the film 200 to the second jig 20 specifically includes:

Step 121: Fasten the film 200 to a carrier film 400.

Specifically, the film 200 is fastened to the carrier film 400 by using an adhesive material, to carry the film 200 by using the carrier film 400. The carrier film 400 is made of a flexible material, and the carrier film 400 can be bent and deformed. In some implementations of this application, the adhesive material for fastening the film 200 to the carrier film 400 is an ultraviolet-sensitive optically clear adhesive. After the film 200 is bonded to the lens 300, the carrier film 400 may be peeled from the film 200 through ultraviolet exposure.

In this implementation, by carrying the film 200 through the carrier film 400, the film 200 can be protected from being easily damaged in a subsequent process of being transferred to the film carrying zone 21 of the second jig 20, and the film 200 can be more easily transferred.

Step 122: Transfer the film 200 through the carrier film 400 until the film 200 is opposite to the film carrying zone 21 of the second jig 20, and clamp the carrier film 400 on two sides of the film 200 by using a clamping member 500, to ensure that a part of the carrier film 400 carrying the film 200 can be tightened.

In some implementations, the film 200 can be transferred to a position opposite to the film carrying zone 21 of the second jig 20 in a manner of winding through a pulley. In addition, when the film 200 is transferred to the position opposite to the film carrying zone 21 of the second jig 20, two sides of the film 200 on the carrier film 400 are clamped by using the clamping member 500, and the clamping member 500 on the two sides of the film 200 ensures that a part of the carrier film 400 carrying the film 200 is kept in a tightened state, thereby ensuring that the film 200 located on the carrier film 400 is in an expanded state, to facilitate a subsequent film bonding process.

Step 123: Drive the film 200 on the carrier film 400 to move relative to the second jig 20, until the carrier film 400 moves to come into contact with the second jig 20.

In this application, the driving the film 200 on the carrier film 400 to move relative to the second jig 20 may be keeping the second jig 20 motionless, and moving the clamping member 500 that clamps the carrier film 400, to drive the carrier film 400 and the film 200 located on the carrier film 400 to move toward the second jig 20, until the carrier film 400 moves to come into contact with the second jig 20. Alternatively, the driving the film 200 on the carrier film 400 to move relative to the second jig 20 may be keeping a position on the carrier film 400 unchanged, and moving the second jig 20 toward the carrier film 400 until the carrier film 400 moves to come into contact with the second jig 20.

Step 124: Enable a vacuumization device in communication with vacuum holes 22 of the second jig 20, to adsorb and fasten, through vacuum suction, a part of the carrier film 400 corresponding to a position on the film 200 to the film carrying position 21 of the second jig 20, to fasten the film 200 to the film carrying position 21 of the second jig 20.

In some implementations of this application, the film carrying zone 21 is a convex surface. When the vacuumization device is enabled to fasten the carrier film 400 and the film 200 on the carrier film 400 to the film carrying position 21 through the vacuum adsorption force at positions on the vacuum holes 22, the clamping members 500 on the two sides of the film 200 may be further moved toward the second jig 20, to tighten positions on the carrier film 400 on the two sides of the film 200 by using the clamping members 500, ensure that two ends of the film 200 carried on the carrier film 400 can be more firmly bonded to the film carrying position 21, avoid a problem that the two ends of the film 200 are warped due to insufficient vacuum adsorption force, and ensure a bonding effect of the film 200.

It may be understood that, in the method for bonding a film to a lens in this application, a sequence of step 110 and step 120 may be randomly changed, that is, step 110 may be performed before step 120; step 120 may be performed before step 110; or step 110 and step 120 may be performed simultaneously.

Referring to FIG. 7 again, after step 120 is completed, the method further includes step 130: Obtain boundary information of a full aperture of the lens 300, to align the lens 300 with the first jig 200.

In some implementations of this application, the device 100 for bonding a film to a lens further includes a first alignment camera. The first alignment camera has high resolution, and a photographing range of the first alignment camera can cover a range of the full aperture of the lens 300, so that the boundary information of the full aperture of the lens 300 can be obtained. The boundary information of the full aperture of the lens 300 is obtained through the high-resolution alignment camera, to accurately obtain a central position on the lens 300. The lens 300 is moved to cause the central position on the lens 300 to be opposite to a central position on the lens carrying zone 11 of the first jig 10, that is, a connection line between the central position on the lens 300 and the central position on the lens carrying zone 11 of the first jig 10 is collinear with an optical axis of the lens 200. In this way, the lens 300 is aligned with the first jig 10. The obtaining the boundary information of the full aperture of the lens 300 through the high-resolution first alignment camera is specifically: moving the first alignment camera until the first alignment camera is right above the lens 300 and has a lens direction facing the lens 300; and photographing the full aperture of the lens 300 through the high-resolution first alignment camera, and obtaining imaging boundary information of the lens 300 through a processor, to obtain the boundary information of the full aperture of the lens 300. Central position information of the lens 300 is obtained through calculation by using the boundary information, to obtain the central position on the lens 300. Specifically, in this implementation, the first alignment camera is a charge coupled device (charge coupled device, CCD) camera. In this implementation, the photographing range of the first alignment camera can cover the range of the full aperture of the lens 300, to accurately obtain the central position on the lens 300. Compared with a manner in which only some positions on the lens 300 are identified and aligned, in this implementation of this application, the photographing the full aperture of the lens 300 can ensure accuracy of alignment between the lens 300 and the first jig 10. In some implementations of this application, precision of alignment between the lens 300 and the first jig 10 may reach 0.05 mm to 0.1 mm.

Step 140: Obtain boundary information of a full aperture of the film 200, to align the film 200 with the second jig 20.

In some implementations of this application, the device 100 for bonding a film to a lens further includes a second alignment camera. The second alignment camera has high resolution, and a photographing range of the second alignment camera can cover a range of the full aperture of the film 200, so that the boundary information of the full aperture of the film 200 can be obtained. The boundary information of the full aperture of the film 200 is obtained through the high-resolution alignment camera, to accurately obtain a central position on the film 200. The film 200 is moved to enable the center of the film 200 to be opposite to the central position on the second jig 20, that is, a connection line between the center of the film 200 and the center of the second jig 20 is perpendicular to the film 200, thereby implementing alignment between the film 200 and the second jig 20. The obtaining the boundary information of the full aperture of the film 200 through the high-resolution second alignment camera is specifically: moving the second alignment camera until the second alignment camera is right above the film 200 and has a lens direction facing the film 200; and then photographing the full aperture of the film 200 through the high-resolution second alignment camera, and obtaining imaging boundary information of the film 200 through a processor, to obtain the boundary information of the full aperture of the film 200. Central position information of the film 200 is obtained through calculation by using the boundary information of the full aperture of the film 200, to obtain the central position on the film 200. Specifically, in this implementation, the second alignment camera is a charge coupled device (charge coupled device, CCD) camera. In this implementation, the photographing range of the second alignment camera can cover a full range of the film 200, so that the boundary information of the full aperture of the film 200 can be obtained, to accurately obtain the central position on the film 200. Compared with a manner in which only some positions on the film 200 are identified and aligned, in this implementation of this application, the photographing the full aperture of the film 200 ensures accuracy of alignment between the film 200 and the second jig 20. In some implementations of this application, precision of alignment between the film 200 and the second jig 20 may reach 0.05 mm to 0.1 mm.

It should be noted that in this implementation of this application, alignment between the lens 300 and the first jig 10 may be implemented by using the first alignment camera, alignment between the film 200 and the second jig 20 may be implemented by using the second alignment camera, and there is no mutual impact. Therefore, step 130 and step 140 may be performed simultaneously, thereby improving film bonding efficiency. It may be understood that, in another implementation of this application, alignment between the lens 300 and the first jig 10 and alignment between the film 200 and the second jig 20 may be implemented by using a same alignment camera. To be specific, after implementing alignment between the lens 300 and the first jig 10, the alignment camera moves to a position corresponding to the second jig 20, and then performs alignment between the film 200 and the second jig 20. In this case, step 130 is first completed, and then step 140 is completed; or step 140 is completed first, and then step 130 is completed.

Step 150: Control the first jig 10 and the second jig 20 to move relative to each other, to gradually bond a middle position to an edge position on the lens 300 to the film 200.

In this implementation of this application, the second jig 20 may be kept motionless, and the control mechanism 30 controls the first jig 10 to move to gradually approach the second jig 20; or the first jig 10 may be kept motionless, and the control mechanism 30 controls the second jig 20 to gradually approach the first jig 10, so that the middle position to the edge position on the lens 300 are gradually bonded to the film 200. Alternatively, in some implementations, the control mechanism 30 may control the first jig 10 to move by a specific distance, and control the second jig 20 to move by a specific distance, so that the middle position to the edge position on the lens 300 are gradually bonded to the film 200. Specifically, in the implementation shown in FIG. 1, the first control mechanism 31 of the control mechanism 30 first controls the first cavity 41 to move toward the second cavity 42, so that the first jig 10 moves toward the second jig 20 by some distance. The first control mechanism 31 controls the first cavity 41 to move toward the second cavity 42 until the first cavity 41 and the second cavity 42 are jointed together in a covering manner, and a confined space formed by joining the first cavity 41 and the second cavity 42 together in the covering manner is vacuumized, so that a subsequent process of bonding the film 200 to the lens 300 can be performed in a vacuum environment, to avoid generating a bubble between the film 200 and the lens 300 when the film 200 is bonded to the lens 300. Then, the second control mechanism 32 of the control mechanism 30 controls the second jig 20 to move toward the first jig 10, so that the middle position to the edge position on the lens 300 are gradually bonded to the film 200.

In this implementation of this application, because the second jig 20 is a flexible jig, in a process of moving the first jig 10 toward the second jig 20, the middle position on the lens 300 first comes into contact with the film 200. As the first jig 10 further moves toward the second jig 20, the second jig 20 is gradually deformed, so that the middle position to the edge position on the lens 300 gradually come into contact with and are bonded to the film 200.

It should be noted that in the device 100 for bonding a film to a lens in the implementations shown in FIG. 1 and FIG. 2, the first jig 10 and the second jig 20 are disposed opposite to each other. Therefore, the controlling the first jig 10 and the second jig 20 to move relative to each other, to gradually bond the middle position to the edge position on the lens 300 to the film 200 mentioned in step 150 is: controlling the first jig 10 and the second jig 20 to move opposite to each other, to gradually bond the middle position to the edge position on the lens 300 to the film 200. In some other implementations of this application, when the first jig 10 and the second jig 20 in the device 100 for bonding a film to a lens are disposed in parallel, the controlling the first jig 10 and the second jig 20 to move relative to each other, to gradually bond the middle position to the edge position on the lens 300 to the film 200 mentioned in step 150 is: overturning the first jig 10 or the second jig 20, to dispose the second jig 20 and the first jig 10 opposite to each other; and then controlling the first jig 10 and the second jig 20 to move opposite to each other, to gradually bond the middle position to the edge position on the lens 300 to the film 200.

In this implementation of this application, the planar film 200 gradually comes into contact with and is bonded to the lens 300 from the middle position to the edge position, so that the planar film 200 from the middle position to the edge position can be evenly deformed, thereby avoiding a case that after the planar film 200 is bonded to the lens 300, optical performance, mechanical performance, and the like of the film 200 are changed, and consequently, optical performance and mechanical performance of an optical element finally obtained through bonding are affected. For example, in some implementations of this application, the film 200 is an optical film having an optical axis, such as a reflective polarization film, a quarter-wave plate, or a half-wave plate. According to the method for bonding a film in this implementation of this application, an optical axis offset between a central position and an edge position on the film 200 generated after the film 200 is bonded can be less than or equal to ±5°, and an optical performance difference between the center and the edge of the film 200 can be less than or equal to ±10%. In addition, the method for bonding a film 200 in this application is easy to operate, and does not need to first heat the planar film 200 into a curved film with an ideal shape through processes such as heating, pressure preservation, stretching, and softening, and then bond the curved film 200 to the lens 300, thereby avoiding a case that optical performance or mechanical performance of the bonded film 200 is affected due to the processes such as heating, pressure preservation, stretching, and softening while simplifying the bonding method.

In some implementations of this application, before the "gradually bonding a middle position to an edge position on the lens to the film" in step 150, the method further includes:

Step 141: Heat the film 200 by using the second jig 20.

In this implementation of this application, the film 200 can be softened by heating the film 200, so that the film 200 can be better bonded to a film carrying zone 21. In addition, in a process of bonding the film 200 to the lens 300, because the film 200 can be more easily deformed after being heated, the film 200 can be bonded to a surface of the lens 300 flatly, thereby avoiding a problem such as a wrinkle that occurs when the film 200 is bonded to the film bonding surface of the lens 300. In addition, in this implementation of this application, all positions on the film 200 are evenly heated by using the second jig 20, to ensure that the positions on the film 200 can have a same deformation capability, and avoid a wrinkle or a change in an optical axis direction caused by uneven stretching of the positions on the film 200, thereby ensuring quality of an optical element finally obtained by bonding the film. In addition, the film 200 is heated by using the second jig 20. Because the second jig 20 has a specific heat preservation function, the film 200 can be heated in an entire bonding process, to ensure that the film 200 can always be in a heated state in the process of bonding the film 200 to the lens 300, thereby achieving a better bonding effect.

In this implementation of this application, the device 100 for bonding a film to a lens includes a film heater 600. The film heater 600 is fastened to a side that is of the second jig 20 and that is away from the film 200. During working, the film heater 600 heats the second jig 20, so that heat generated by the film heater 600 is transferred to the second jig 20, and then the film 200 is heated by using the second jig 20. In this implementation, because the second jig 20 has a specific heat preservation effect, after the film heater 600 is stalled out, the second jig 20 can still continuously heat the film 200, thereby reducing energy consumption. In some implementations of this application, the second jig 20 can generate a heating temperature of 30° C. to 150° C., to ensure that the second jig 20 can fully heat the film 300, to ensure that the film 200 can have a good bonding effect with the lens 300.

In some implementations of this application, before the "gradually bonding a middle position to an edge position on the lens to the film" in step 150, the method further includes:

Step 142: Heat the lens 300 by using the first jig 10.

In this implementation of this application, the lens 300 is heated, so that a temperature difference between the film 200 and the lens 300 can be reduced in the process of bonding the film 200 to the lens 300, to ensure that a stress between the film 200 and the lens 300 can be small after the film 200 and the lens 300 are bonded and cooled, thereby ensuring stability of the bonding between the film 200 and the lens 300. In some implementations of this application, a temperature difference between the lens 300 and the film 200 is less than 30°, so that stability of the bonding between the film 200 and the lens 300 can be effectively ensured. In this implementation of this application, all positions on the lens 300 are evenly heated by using the first jig 10, to ensure a temperature balance between the positions on the lens 300 in the process of bonding the film 200 to the lens 300. In some implementations, a temperature difference between the lens 300 and the film 200 is less than 10°, so that stability of the bonding between the film 200 and the lens 300 can be more effectively ensured.

In some implementations of this application, the device 100 for bonding a film to a lens includes a lens heater 700. The lens heater 700 is fastened to a side that is of the first jig 10 and that is away from the lens 300. During working, the lens heater 700 heats the first jig 10, so that heat generated by the lens heater 700 is transferred to the first jig 10, and then the lens 300 is heated by using the first jig 10. In this implementation, because the first jig 10 can have a specific heat preservation effect, after the lens heater 700 is stalled out, the first jig 10 can still continuously heat the lens 300, thereby reducing energy consumption. In some implementations of this application, the lens heater 700 can generate a heating temperature of 30° C. to 150° C., to ensure that the first jig 10 can be fully heated, to reduce a temperature difference between the film 200 and the lens 300 during bonding.

In this implementation of this application, step 142 and step 143 may be performed at any time after step 120 and before step 150. This is not specifically limited herein. In the implementation shown in FIG. 7, step 142 and step 143 are performed after step 140 and before step 150.

In some implementations of this application, after the film 200 is bonded to the lens 300 in step 150, heat preservation and pressure preservation may be further performed for a specific time on the lens 300 to which the film 200 is bonded, to ensure firmness of bonding between the film 200 and the lens 300. Specifically, in some implementations of this application, after the film 200 is bonded to the lens 300, the lens 300 to which the film 200 is bonded is subjected to heat preservation and pressure preservation for more than 5 s at a pressure of 1 to 2000 kgf and a temperature of 30° C. to 150° C.

In some implementations of this application, an adhesive layer and a release film are stacked on the film 200. The adhesive layer can bond the film 200 to a surface of the lens 300. In this implementation of this application, the adhesive layer may be various types of transparent adhesive materials such as an optically clear adhesive (optically clear adhesive. OCA) and a pressure sensitive adhesive (pressure sensitive adhesive, PSA). In some implementations of this application, a thickness of the adhesive layer is 5 μm to 50 μm, to ensure that the film 200 can be stably bonded to the lens 300 by using the adhesive layer, and avoid a case that a thickness of the adhesive layer is excessively large and consequently a thickness and optical performance of an optical element obtained by bonding the lens 300 to the film 200 are affected.

In some implementations, the adhesive layer for bonding the film 200 to the lens 300 and the adhesive material for fastening the film 200 to the carrier film 400 are made of a same material, to ensure that when the carrier film 400 is subsequently peeled from the film 200, firmness of bonding between the film 200 and the lens 300 is not affected.

The release film is also referred to as a peeling film, an isolation film, a separation film, or an adhesive resistant film. The release film can ensure that a coating film layer has specific release force, to protect the adhesive layer. In this implementation, when the film 200 is bonded to the lens 300, a release film layer needs to be removed, to bond the film 200 to the lens 300 by using the adhesive layer. Therefore, in these implementations, before step 150, the method further needs to include the following step: removing the release film from the surface of the film 200.

In this implementation, when the film 200 is fastened to the first jig 10, the release film is located on a surface that is of the film 200 and that is away from the first jig 10. After the release film is removed, the adhesive layer on the surface of the film 200 is opposite to the lens 300. When the lens 300 is close to the film 200, the film 200 can be bonded to the lens 300.

In some implementations of this application, before step 150, the method further includes:

Step 111: Perform surface activation processing on a surface of the lens 300.

In this implementation of this application, the surface activation processing on the lens 300 can generate a polar group (for example, a hydroxy oxide film) on the surface of the lens 300 or coarsen the surface of the lens 300, so that the film 200 can be more firmly attached to the surface of the lens 30). In some implementations, when the surface activation processing is performed on the surface of the lens

300, the surface of the lens 3M) is cleaned, to ensure that no impurity exists between the lens 300 and the film 200 after the film is bonded, and ensure film bonding quality.

In some implementations of this application, activation processing is performed on the surface of the lens 300 in a plasma processing manner, and impurities on the surface of the lens 300 can be removed. It may be understood that, in some other implementations of this application, the film bonding surface of the lens 300 may alternatively be cleaned in another cleaning manner.

In this implementation of this application, step 111 may be performed at any moment before step 150. In the implementation shown in FIG. 7, step 111 is performed before step 110. To be specific, after the surface activation processing is first performed on the film bonding surface of the lens 300, the lens 30) is fastened to the first jig 10. It may be understood that, in some other implementations of this application, step 111 may be performed at any moment between step 110 and step 150. This is not specifically limited herein.

In some implementations of this application, after step 140 and before step 150, the method further includes:

Step 141: Obtain the boundary information of the full aperture of the lens 300 and the boundary information of the full aperture of the film 200, to align the lens 300 with the film 200.

Specifically, in this implementation of this application, alignment between each position on the lens 300 and each position on the film 200 may be implemented by using a third alignment camera. In some implementations, when the lens 300 is aligned with the film 200, the third alignment camera may be moved to a position between the lens 300 and the film 200 that are disposed opposite to each other, and the boundary information of the full aperture of the lens 300 is obtained by using the third alignment camera, to determine the central position on the lens 300. In addition, the boundary information of the full aperture of the film 200 is obtained, to determine the central position on the film 200. Then, the first jig 10 and the second jig 20 are moved relative to each other, so that the central position on the lens 300 is opposite to the central position on the film 200, thereby aligning the lens 300 with the film 200. In this implementation, before the film 200 is bonded to the lens 300, the film 200 is aligned with the lens 300, so that precision of bonding the film 200 to the lens 300 can be further improved.

It should be noted that after the third alignment camera completes alignment between the lens 300 and the film 200, the third alignment camera may be moved to leave the position between the lens 300 and the film 200, to prevent the third alignment camera from blocking relative movement between the lens 300 and the film 200 during bonding.

It may be understood that, in some other implementations of this application, step 141 may alternatively not be performed, and the film 200 and the lens 300 are aligned through structurally precise fit between the first jig 10 and the second jig 20.

In some implementations of this application, after step 150 is completed, the method may further include:

Step 151: Unfasten the lens 300 from the first jig 10, and unfasten the film 200 from the second jig 20.

Specifically, for the device 100 for bonding a film to a lens in the implementation shown in FIG. 1, the unfastening the film 200 from the second jig 20 includes: disabling the vacuumization device, so that the second jig 20 generates no vacuum adsorption force on the film 200, to unfasten the film 200 from the second jig 20. For the device 100 for bonding a film to a lens in the implementation shown in FIG.

2, the unfastening the film 200 from the second jig 20 includes: disabling the vacuumization device, so that the second jig 20 generates no vacuum adsorption force on the film 200; and loosening the carrier film 400 from clamping of the clamping member 500, to unfasten the film 200 from the second jig 20.

Step 152: Perform debubbling processing on the lens 300 to which the film 200 is bonded.

Specifically, in some implementations of this application, the film bonding jig 100 further includes a debubbling jig. The lens 300 that is taken out from the first jig 10 and the second jig 20 and to which the film 200 is bonded is placed in the debubbling jig, and pressure preservation and heat preservation processing is performed on the lens 300 to which the film 200 is bonded, to make it convenient to discharge a bubble between the film 200 and the lens 300, and ensure optical quality of the optical element. In this implementation, when the pressure preservation and heat preservation processing is performed on the film 200, a pressure is 0.1 MPa to 1 MPa, a temperature is 40° C. to 80° C., and a heat preservation and pressure preservation time is 5 min to 1 h, to ensure that a bubble between the film 200 and the lens 300 can be discharged, and the temperature, the pressure, and the time of the heat preservation and pressure preservation can be controlled, to avoid impact of a debubbling process on optical performance of the optical element.

Specifically, in some implementations of this application, the film bonding jig 100 further includes a transfer mechanism such as a robotic arm or a belt pulley. The lens 300 to which the film 200 is bonded is taken out from the first jig 10 and the second jig 20 by using the transfer mechanism such as a robotic arm or a belt pulley, and is placed in the debubbling jig for debubbling processing.

For the device 100 for bonding a film to a lens shown in FIG. 2, after the debubbling processing is performed on the lens, the method further includes: Peel the carrier film 400 from the film 200. In some implementations, the peeling the carrier film 400 from the film 200 includes: performing ultraviolet (Ultraviolet Rays, UV) exposure on a position at which the film 200 is bonded to the carrier film 400, so that the adhesive layer at which the film 200 is bonded to the carrier film 400 is cured and deactivated, and the film 200 is peeled from the carrier film 400. It should be noted that the adhesive layer between the film 200 and the lens 300 is an ultraviolet-insensitive adhesive layer, to avoid a case that when the carrier film 400 is peeled from the film 200 through ultraviolet rays, ultraviolet exposure affects firmness of bonding between the film 200 and the lens 30). Referring to FIG. 9. FIG. 9 is a schematic diagram of working modules of a device 100 for bonding a film to a lens according to an implementation of this application. In some implementations of this application, the device 100 for bonding a film to a lens further includes a memory 101, a processor 102, and a program for bonding a film to a lens. The program for bonding a film to a lens is stored in the memory 101 and is runnable on the processor 102. The program for bonding a film to a lens is executed by the processor 102 to control the device 100 for bonding a lens to perform the foregoing method for bonding a film to a lens.

The foregoing descriptions are example implementations of this application. It should be noted that a person of ordinary skill in the art may make several improvements and embellishments without departing from the principle of this application, and the improvements and embellishments shall also fall within the protection range of this application.

What is claimed is:

1. A method for bonding a film to a lens, wherein the method comprises:

fastening the lens to a first jig;

fastening the film to a second jig, wherein the second jig is a deformable flexible jig, and wherein a size of the film is equal to or less than an effective aperture of the lens;

obtaining first boundary information of a first full aperture of the lens in order to align the lens with the first jig;

obtaining second boundary information of a second full aperture of the film in order to align the film with the second jig; and moving the first jig and the second jig relative to each other in order to gradually bond from a middle position to an edge position on the lens to the film.

2. The method of claim 1, wherein before gradually bonding from the middle position to the edge position on the lens to the film, the method further comprises heating the film using the second jig.

3. The method of claim 2, wherein before gradually bonding from the middle position to the edge position on the lens to the film, the method further comprises heating the lens using the first jig in order to enable a temperature difference between the lens and the film to be less than 30° Celsius (C) before the lens and the film are bonded.

4. The method of claim 1, wherein obtaining the first boundary information of the first full aperture comprises obtaining, using a first alignment camera, the first boundary information of the first full aperture, wherein a first photographing range of the first alignment camera covers the first full aperture, wherein obtaining the second boundary information of the second full aperture comprises obtaining, using a second alignment camera, the second boundary information of the second full aperture, and wherein a second photographing range of the second alignment camera covers the second full aperture.

5. The method of claim 1, further comprising:

unfastening the lens from the first jig;

unfastening the film from the second jig; and performing debubbling processing on the lens to which the film is bonded.

6. The method of claim 5, wherein the debubbling processing comprises:

placing the lens to which the film is bonded in a debubbling jig; and performing pressure preservation and heat preservation processing on the lens to which the film is bonded, wherein during the pressure preservation and heat preservation processing, a pressure is 0.1 megapascals (MPa) to 1 MPa, a temperature is 40° C. to 80° C., and a heat preservation and pressure preservation time is 5 minutes to 1 hour.

7. The method of claim 1, further comprising fastening the film to a film carrying zone of the second jig, wherein a film bonding surface is a surface of the lens to which the film is bonded, wherein when the film bonding surface is a concave surface, the film carrying zone is convex, and a first curvature radius of the film carrying zone is less than a second curvature radius of the film bonding surface, and wherein when the film bonding surface is a convex surface, the film carrying zone is a plane or concave, and the first curvature radius is greater than the second curvature radius.

8. The method of claim 7, further comprising further fastening the film to the film carrying zone using vacuum adsorption force of vacuum holes in an array on the film carrying zone.

9. The method of claim 1, wherein the effective aperture ranges from 1 millimeter (mm) to 60 mm, wherein when a film bonding surface of the lens is a convex surface, a first ratio of a curvature radius of the film bonding surface to a bonding aperture of the film bonding surface is greater than 1.2, and wherein when a film bonding surface is a concave surface, a second ratio of the curvature radius to the bonding aperture of the film bonding surface is greater than 1.5.

10. The method of claim 1, wherein a film bonding surface is a surface of the lens to which the film is bonded, and wherein a surface shape of the film bonding surface is a spherical surface, an aspheric surface, or a free recurved surface.

11. The method of claim 1, wherein fastening the film to the second jig comprises:
fastening the film to a carrier film;
clamping the carrier film on two sides of the film using a clamping member;
transferring the film opposite to the second jig, wherein an orthographic projection of the second jig on a plane on which the film is located covers the film; and
moving the carrier film and the second jig relative to each other until the film on the carrier film is bonded to the second jig.

12. The method of claim 1, wherein before moving the first jig and the second jig relative to each other, the method further comprises aligning the lens with the film.

13. The method of claim 1, wherein before moving the first jig and the second jig relative to each other, the method further comprises performing surface activation processing on a surface of the lens.

14. A device comprising:
a memory configured to store instructions for bonding a film to a lens; and
a processor coupled to the memory and configured to execute the instructions to cause the device to:
fasten the lens to a first jig;
fasten the film to a second jig, wherein the second jig is a deformable flexible jig;
obtain, using a first alignment camera, first boundary information of a first full aperture of the lens in order to align the lens with the first jig, wherein a first photographing range of the first alignment camera covers the first full aperture of the lens;
obtain, using a second alignment camera, second boundary information of a second full aperture of the film in order to align the film with the second jig, wherein a second photographing range of the second alignment camera covers the second full aperture of the film; and
move the first jig and the second jig relative to each other, to gradually bond a middle position to an edge position on the lens to the film.

15. The device of claim 14, wherein before gradually bonding the middle position to the edge position on the lens to the film, the processor is further configured to execute the instructions to cause the device to heat the film suing the second jig.

16. The device of claim 15, wherein before gradually bonding the middle position to the edge position on the lens to the film, the processor is further configured to execute the instructions to cause the device to heat the lens using the first jig in order to enable a temperature difference between the lens and the film to be less than 30° Celsius (C.) before the lens and the film are bonded.

17. The device of claim 14, wherein the processor is further configured to execute the instructions to cause the device to:
unfasten the lens from the first jig;
unfasten the film from the second jig; and
perform debubbling processing on the lens to which the film is bonded.

18. The device of claim 17, wherein the processor is further configured to execute the instructions to cause the device to perform the debubbling processing by:
placing the lens to which the film is bonded in a debubbling jig; and
performing pressure preservation and heat preservation processing on the lens to which the film is bonded, wherein during the pressure preservation and heat preservation processing, a pressure is 0.1 megapascals (MPa) to 1 MPa, a temperature is 40° C. to 80° C., and a heat preservation and pressure preservation time is 5 minutes to 1 hour.

19. A method for bonding a film to a lens, wherein the method comprises:
fastening the lens to a first jig, wherein an effective aperture of the lens ranges from 1 millimeter (mm) to 60 mm, wherein when a film bonding surface of the lens is a convex surface, a first ratio of a curvature radius of the film bonding surface to a bonding aperture of the film bonding surface is greater than 1.2, and wherein when the film bonding surface is a concave surface, a second ratio of the curvature radius to the bonding aperture of the film bonding surface is greater than 1.5;
fastening the film to a second jig, wherein the second jig is a deformable flexible jig;
obtaining first boundary information of a first full aperture of the lens in order to align the lens with the first jig;
obtaining second boundary information of a second full aperture of the film in order to align the film with the second jig; and
moving the first jig and the second jig relative to each other in order to gradually bond from a middle position to an edge position on the lens to the film.

20. The method of claim 19, wherein before gradually bonding from the middle position to the edge position on the lens to the film, the method further comprises heating the film using the second jig.

* * * * *